April 22, 1924.　　　　　J. E. BODA　　　　　1,491,579
POWER LIFT PLOW
Filed Feb. 13, 1922　　　2 Sheets-Sheet 2
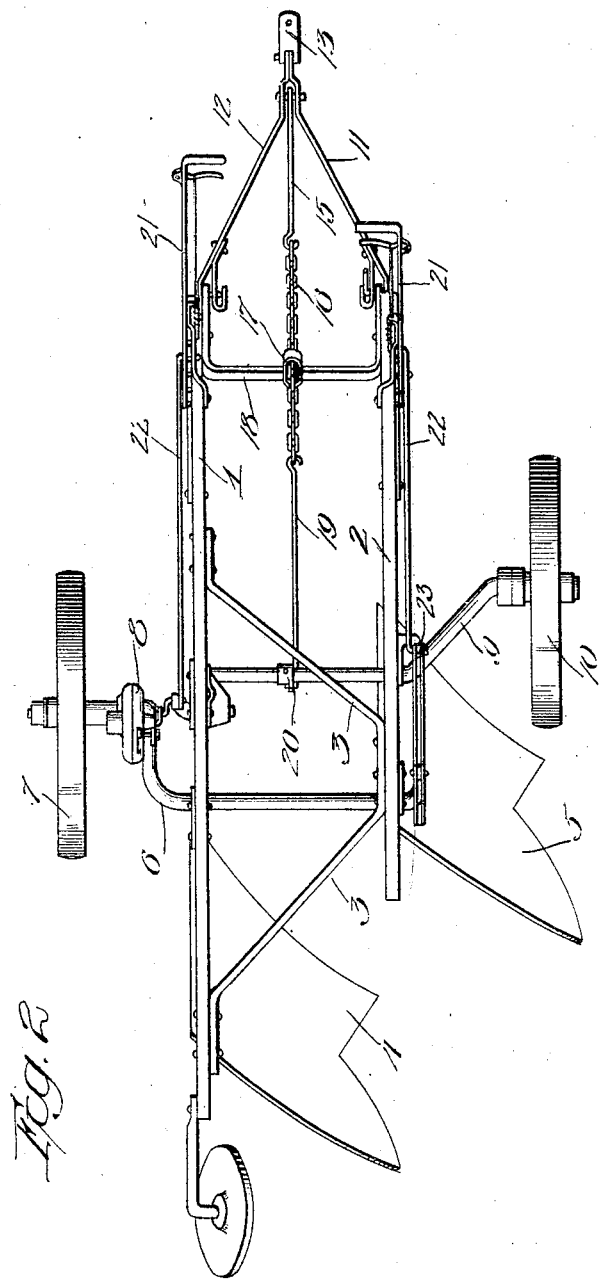
Inventor:
Joseph E. Boda
L. C. Shonts Atty Patented Apr. 22, 1924.

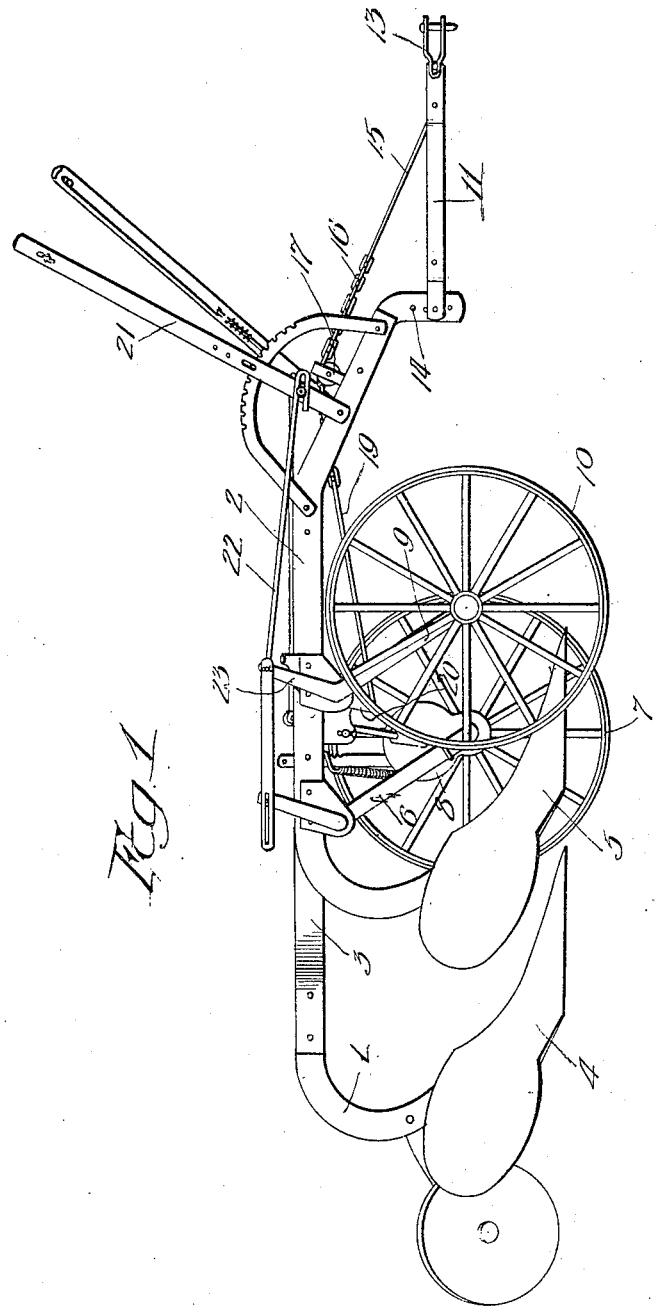

1,491,579

UNITED STATES PATENT OFFICE.

JOSEPH E. BODA, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

POWER-LIFT PLOW.

Application filed February 13, 1922. Serial No. 536,106.

*To all whom it may concern:*

Be it known that I, JOSEPH E. BODA, a citizen of the United States, residing at 2115 16th St., Moline, county of Rock Island, State of Illinois, have invented certain new and useful Improvements in Power-Lift Plows, of which the following is a specification.

The invention relates to draft connections for plows.

It is particularly applicable for use with power lift tractor plows, such as shown in my co-pending application, filed April 6, 1921, Serial No. 459,449.

The lifting mechanism in plows of this type is located slightly forward of the center of gravity so that, as it operates, the tendency is to lift the front end of the plow beams. It is necessary that the forward end of these beams be braced so that they cannot move upward, thereby forcing the lifting mechanism to raise the rear ends of the plow beams to remove the plow bodies from the ground.

This may be done by providing a rigid draft connection for the front end of the plow beams, but the difficulty with such a connection is that, when the plows are in plowing position, the draft mechanism is not sufficiently free to permit the plows to operate most efficiently. The present invention has been devised to overcome these difficulties.

The general object of the invention is to provide an improved draft connection for plows.

A more particular object is to provide an improved draft connection which will rigidly brace the front end of the plow beams when the lifting mechanism operates to lift the plows and, which, at the same time, will provide the requisite flexibility when the plows are in plowing position.

Other objects and advantages of the invention will appear from the specification and drawings.

An embodiment of the invention is shown in the accompanying drawings in which,

Figure 1 is a side view of a plow having the improved draft connections applied thereto.

Figure 2 is a plan view of the plow.

The plow includes a pair of plow beams 1 and 2 connected by a brace 3 and carrying plow bodies 4 and 5. Supporting the plow beams is a land-wheel crank axle 6 carrying a land wheel 7 and having a power lift mechanism 8 associated therewith. A furrow wheel crank axle 9 is also provided carrying a furrow wheel 10.

The draft connection is attached to the front end of the plow beams and includes two rigid bars 11 and 12 which converge forwardly, are attached together, and connected to a clevis 13. The connection of the draft bars to the plow beams may be made in a variety of ways, but is preferably a pivotal connection, as shown, with provision made for adjustment by providing a plurality of holes 14 for the reception of the pin or bolt connecting the draft bars to the beams.

Connected to the draft bars 11 and 12 near the point where they converge is a link 15 to which is connected in turn a flexible member comprising a chain 16 passing over a pulley 17 carried by the brace 18 extending between the front ends of the plow beams. This chain is connected to a second link 19 which is pivotally connected in turn to an arm 20 rigidly fixed to the furrow wheel crank axle. The function of this construction and its operation is as follows:

With the plows in raised position, the position of the parts is as illustrated in Figure 1. The position of the crank axle 9 is such that the bracket 20 to which the link 19 is connected, maintains the link so that the chain 16 is taut. The tendency is for the weight of the plows to throw the front end of the plow beams upwardly. This would cause a break in the draft connection at the point where the draft bars 11 and 12 are pivoted to the plow beams were it not prevented by reason of the fact that the pulley 17 which is rigidly fixed to the front plow beam framework bears against the chain 16, but cannot move upwardly because the chain is taut. The draft mechanism thereby braces the front end of the plow beams and prevents the upward movement. This action takes place as the plow beams are raised and continues as long as they are maintained in raised position.

When the plows are lowered, the furrow wheel crank axle 9 moves forwardly or in a counter-clockwise direction. This swings the arm 20 in a counter-clockwise direction and moves the link 19 forwardly relieving the tension on the chain 16. The length of the arm 20 and the proportion of the parts is such that when the furrow wheel reaches any of its plowing positions, the chain 16 is slacked sufficiently so that it does not interfere with free movement of the draft bars 11 and 12. The result of this is that the draft bars are free to adjust themselves to compensate for unevenness in the surface of the ground over which the plow and the tractor drawing it are running.

The height of the furrow wheel crank axle 9 may be adjusted by means of the lever 21 connected by the link 22 to an arm 23.

It will thus be seen that there has been provided a draft connection which permits full freedom of movement when the plows are in plowing position and, which, at the same time becomes rigid when the plows are raised. This rigidity is controlled by movements of the furrow wheel crank axle.

It will be understood that the structure shown is for purposes of illustration only and that other structures may be devised which come within the spirit and scope of the appended claims.

I claim:

1. The combination with a plow having plow beams and a crank axle that may be swung relative to the plow to raise and lower it, of a draft device comprising draft members pivoted to the forward end of the plow so as to be movable in a vertical plane, and means connecting the forward end of the draft device and the crank axle, said means including a flexible portion passing over a guide supported by the front end of the plow.

2. The combination with a plow having plow beams and a crank axle that may be swung relative to the plow to raise and lower it, of a draft device comprising draft members pivoted to the forward end of the plow so as to be movable in a vertical plane, and means connecting the forward end of the draft device and the crank axle comprising links with a flexible chain connecting them, said chain passing over a guide supported by the front end of the plow.

3. The combination with a plow having parallel plow beams joined at their front ends by a cross brace and a crank axle that may be swung relative to the plow to raise and lower it, of a draft device comprising draft members pivoted to the forward end of the plow and converging forwardly, and means connected to the forward ends of the draft device and to the crank axle, said means including a flexible portion passing over a guide supported by the cross brace between the plow beams.

4. The combination with a plow having parallel plow beams with a cross brace extending between their forward ends and a crank axle that may be swung relative to the plow to raise and lower it, of a draft device comprising draft members pivoted to the forward end of the plow and converging forwardly where they are connected together, a link connected to the forward ends of the draft members, a link connected to an arm on the crank axle, a chain connecting said links, and a guide for said chain supported by the cross brace between the beams.

5. The combination with a plow having plow beams, a movable crank axle, of draft mechanism comprising draft members pivoted to the forward ends of the plow beams, a link connected to the draft members, a chain connected to the link and passing over a pulley carried by the forward end of the plow beams and connected to a second link which in turn is connected to a crank on the crank axle so that the forward ends of the beams are prevented from rising when the plow is raised, but are permitted to move freely when the plow is lowered.

In testimony whereof, I affix my signature.

JOSEPH E. BODA.